Nov. 21, 1967     E. LANGGUTH ET AL     3,353,998
ALKALINE BATTERY CELLS WITH SILVER-OXIDE OR SILVER ELECTRODES
Filed Feb. 2, 1965
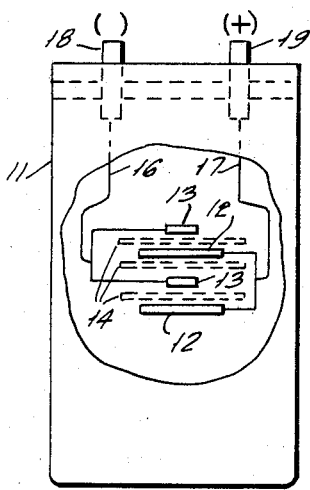
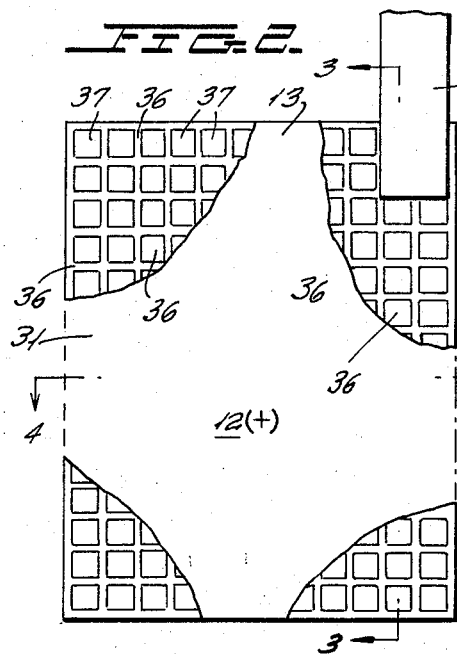
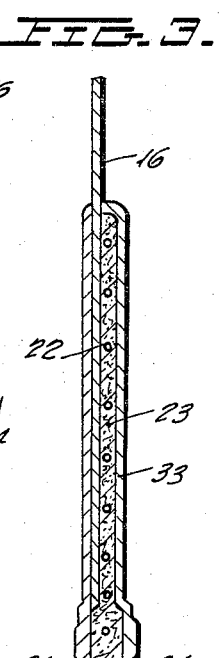
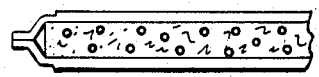
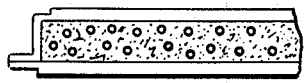
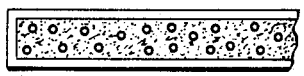
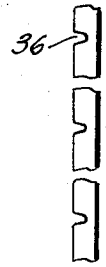
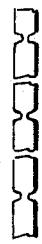
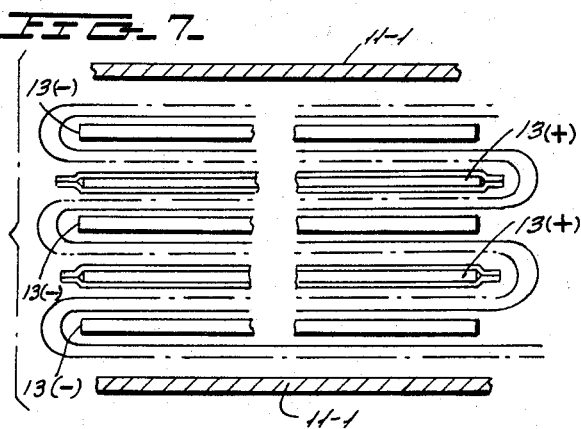
INVENTORS
ERICH LANGGUTH
LOUIS BELOVE
BY
OSTROLENK, FABER, GERB & SOFFEN
ATTORNEYS

United States Patent Office 3,353,998
Patented Nov. 21, 1967

3,353,998
ALKALINE BATTERY CELLS WITH SILVER-OXIDE OR SILVER ELECTRODES
Erich Langguth, White Plains, and Louis Belove, Ardsley, N.Y., assignors to Sonotone Corporation, Elmsford, N.Y., a corporation of New York
Filed Feb. 2, 1965, Ser. No. 429,876
3 Claims. (Cl. 136—6)

This invention relates to rechargeable alkaline battery cells operating with positive silver oxide electrodes (hereinafter also designated "silver" electrodes) such as, for example, silver-cadmium or silver-zinc battery cells.

The invention relates to most types of porous silver electrodes used in such batteries, including positive electrode plates formed of sintered silver particles. In most cases sintered silver electrode plates are formed out of a layer of silver particles having embedded therein a carrier structure, such as perforated or expanded foil as sheet, or a wire screen or grid of silver. Good results are obtained with a layer of silver powder particles of —325 mesh size sintered for about 10 minutes at temperatures below the melting temperature of silver, such as between 540° to 760° C. or 675° to 760° C. However, a satisfactory sinter bond between the silver particles is obtained by sintering for about 20 minutes between 450° C. and 540° C.

According to known data the charging and recharging of the silver electrode of such rechargeable batteries may be represented by the following two equations.

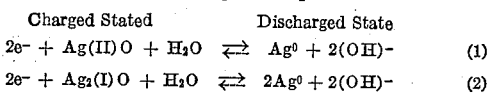

For many years past series difficulties have been encountered with such rechargeable battery cells due to migration of silver oxide content of their silver electrode onto and into the pores of the interposed organic separator where the silver oxide is converted to metallic silver which causes short circuits and results in destruction of the cell. In fact, even without circuit connection to an external circuit, the silver (I) oxide $Ag_2(I)O$ of such silver cell electrode will spontaneously decompose into metallic silver and silver (II) oxide $Ag(II)O$. Such alkaline batteries operating with positive silver electrodes have also a poor shelf life compared with the very long shelf life of nickel-cadmium batteries.

Among the objects of the invention is a rechargeable alkaline battery cell operating with at least one silver electrode plate having a shelf life of at least a year and/ or somewhat approaching that of nicked cadmium batteries and having a charge-discharge cycle life of at least one thousand cycles; also such alkaline battery cell wherein the electrode assembly including the required alkaline electrolyte are enclosed in a sealed cell casing.

In accordance with the invention the shelf life of the battery cells is greatly increased and the charge-discharge cycle life is increased beyond at least 1,000 cycles by enclosing the electrolyte-exposed exterior surface of the silver electrode or electrode plate with a protective enclosure layer of nickel powder particles the pores of which contain or are loaded with a nickel hydroxide active mass, such as used in the nickel hydroxide electrode of nickel-cadmium batteries, with the enclosure layer being at least electro-conductively joined to the underlying silver electrode body. Instead of an active positive electrode mass of nickel hydroxide, the pores of the protective nickel-particle enclosure may be loaded with other analogous metal hydroxides which are inert to alkaline battery electrolyte and have a standard positive electrode potential relative to zero electrode potential of hydrogen gas, as given, for instance, in Handbook of Electrical Constants, by R. Parsons (Butterworth, 1959). Below are given examples of such other suitable inert metal hydroxides together with their standard positive electrode potentials: cobalt (II) hydroxide $Co(II)(OH)_2$—0.17 volt; manganese hydroxide $Mn(OH)_2$—0.10 volt; chromium hydroxide.

The foregoing and other objects of the invention and the principles and practice thereof will be best understood from the following description of exemplifications thereof, reference being had to the accompanying drawings, where FIG. 1 is a partially elevational and partially diagrammatic view of an alkaline battery cell operating with silver electrodes exemplifying the invention;

FIG. 2 is a partially broken plan view of a silver electrode plate of the cell of FIG. 1 in flat position, with a plate portion thereof shown greatly enlarged;

FIG. 3 is a greatly enlarged vertical cross-section view of the electrode plate of FIG. 2.

FIG. 3–A is a cross-sectional view similar to FIG. 3 of the protective cover layer overlying the interior silver electrode plate shown in FIG. 3;

FIG. 3–B is a cross-sectional view similar to FIG. 3–A of a modification of such protective cover layer;

FIG. 4 is a cross-sectional view along lines 4—4 of FIG. 2 of modified silver electrode plate exemplifying the invention;

FIGS. 5 and 6 are cross-sectional views similar to FIG. 4 of two further modifications of silver electrode plates exemplifying the invention; and FIG. 7 is an exploded view showing one type of an electrode assembly of opposite polarity cell electrodes of such alkaline battery cell as they are held together with their electrolyte holding separator layers between opposite side walls of the cell casing.

For clearer illustrations some details and thickness dimensions of the different electrode elements seen in the drawings are shown exaggerated.

Strauss U.S. Patent No. 2,771,500, issued Nov. 20, 1956, is concerned with the difficulties encountered in alkaline rechargeable batteries having a positive silver electrode which upon charging is converted to "a mixture of silver oxide and silver peroxide." Strauss states therein: "A small amount of the positive active material will become migratory within the cell by dissolving in the electrolyte as complexions . . . or by being colloidally dispersed in the electrolyte. These particles or ions then come into contact with the diaphragm or separator and oxidize it while they themselves are being reduced. The destruction of the separator by oxidation may also be caused by . . . silver particles from the positive plate. In either case, the particles lodging between the diaphragm and the positive plate or on the diaphragm form an extension of the electrode surface . . . So long as they are in electrical contact with the positive plate they undergo the same chemical changes as the positive active material, that is to say, upon each recharge of the cell they are reconverted to silver oxide or silver peroxide and will oxidize an additional portion of the diaphragm . . . and . . . the destructive oxidation of the diaphragm proceeds at an ever increasing rate."

Strauss also states that if the positive plate is enclosed by a protective sheath or coating which is inert to the oxides and is of non-conducting material, any silver particles separating from the positive plate are insulated or removed from electrically conductive conduct with the positive plate and therefore will no longer be changed in chemical composition during charging and discharging of the battery cell. His protective sheath "must be inert to the strong alkaline electrolyte and it should not materially increase the internal resistance of the cell." In his preferred form, Strauss dips the silver electrode plate in an aqueous suspension of magnesium hydroxide (milk of magnesia) followed by air drying, which yields a porous electrode sheath about 0.002 to 0.003 of an inch thick, consisting of magnesium oxide and magnesium carbonate. By repeated similar dipping and drying steps the sheath may be given greater thickness. He further states that a protective sheath 0.002 to 0.003 of an inch thick, which is obtained with a single dip in magnesia "affects but little the 'internal' resistance of the cell yet provides current interruptions as between the particles of silver leaving the surface area of the plate and hence to a surprising degree protects the diaphragm from destruction by oxidation."

Strauss further states that, in place of magnesium hydroxide there may be used for the protective sheath nickel hydroxide "or any metal hydroxide which upon air drying or its equivalent, will change to a metal oxide and/or a metal carbonate, each of which is non-conductive to provide the requisite current-interrupting capability."

According to test data given by Strauss, rechargeable cells with silver electrode plates without his protective sheath had a useful life of from eight to ten charge-discharge cycles, and similar cells with silver electrodes having his protective sheath had a useful life of "from sixteen to twenty cycles, and in some instances as high as twenty-five cycles, with most cells giving eighteen cycles." This sheath thus provides only a very limited increase in the cycle life of such cells.

Alkaline batteries operating with silver electrodes are also the subject matter of the article by T. P. Dirkse, "The Silver Oxide Electrode" published in Journal of The Electrochemical Society in May 1959, vol. 106, pages 453–457, listing many references including (reference 22) his Technical Report No. 6, Contract No. Nonr-1682(01), June 30, 1957. He states that the solubility of $Ag_2O$ is at least partly responsible for the poor shelf life characteristic of the silver cell, and that the solubilities of $Ag_2O$ and $AgO$ in alkaline solutions are not far different from each other.

The present invention increases the shelf life of silver-electrodes in alkaline rechargeable batteries to at least a full year, and also increases their charge-discharge cycle life to at least beyond 1,000 cycles. According to the invention this is achieved by enclosing the electrolyte exposed surfaces of the silver electrodes or electrode plates with a protective porous, sintered cover layer of electrically conductive particles, such as nickel powder, which are inert to the electrolyte so that the sintered metal powder layer makes at least electric contact with the underlying silver electrode; and the pores of such protective cover layer are loaded with positive nickel hydroxide active electrode mass, such as used in the positive electrodes of nickel-cadmium batteries. In discharged condition, such nickel hydroxide consists of nickel (II)) hydroxide—$Ni(OH)_2$—which upon charging is converted to the higher oxidation state of nickel (III) oxyhydroxide—$NiO(OH)$. The nickel hydroxide mass may contain minor additions such as one or more hydroxides of Co, Bi, Cd, Ca, Ir, Nb, Rh, Rn, and/or Sn.

The resulting composite positive electrode plate having an inner silver plate and an outer porous cover layer of inert nickel particles loaded with active nickel hydroxide electrode mass will operate with two distinct potentials. Assuming such composite positive battery plate having been fully charged, the initial part of its discharge consists of the conversion of the nickel (III) oxyhydroxide content of the cover layer into nickel (II) hydroxide. In the subsequent portion of its discharge the silver oxide content of the inner plate is converted into metallic silver. On recharging the reverse sequence of conversion takes place, namely, first, the metallic silver is converted into the silver oxides followed by conversion of the nickel (II) hydroxide into nickel (III) oxyhydroxide. This last part of the charging process may be accompanied, preceded or followed by conversion of silver (I) oxide into silver (II) oxide. In like manner, in discharging such fully charged composite positive electrode, the initial part of the discharge may be accompanied, preceded or followed by the conversion of silver (II) oxide into silver (I) oxide.

In accordance with the invention, sintered silver powder electrode plate of known rechargeable batteries may be converted into a composite positive electrode of the invention by placing in electric contact with its opposite faces two coextensive thin sintered nickel electrode plates having pores loaded with positive nickel hydroxide active electrode mass. The edges of such composite electrode plate may be sealed against migration of silver oxide or silver by an adhering edge cover of inert cement, for example, alkaline resistant epoxy resin. As another example, the two porous, loaded, sintered-nickel cover layers may have compacted edges projecting beyond the periphery of the enclosed silver plate and held affixed to each other as by compression or electric welding along their overlapping edges. Good results are obtained with such nickel-hydroxide holding sintered nickel cover layer or plate having a thickness of 0.008 to 0.012 of an inch. However, cover layers of greater thickness, such as 0.020 of an inch thick may be used.

As a further alternative the two nickel-hydroxide-holding cover sheets of such composite silver electrode plate is made with edge regions projective beyond the edges of the enclosed silver electrode plate, and the overlapping projecting edges of the nickel-powder cover sheets are compacted and affixed to each other as by electric welding so that their major areas are in electrical contact engagement with the enclosed silver electrode plate along their facing areas.

As a still further alternative, the sintered silver electrode plate is placed between two thin powder layers of nickel particles, and the composite layer formation is sintered in a protective atmosphere at temperature below the melting temperature of silver, such as in the range of 400° C. to 750° C. Good results are obtained with a sintering temperature of 430° C. for 10 to 20 minutes in a protective atmosphere of dry ammonia. Such treatment yields a composite plate consisting of a sintered porous silver electrode plate enclosed between continuous cover layers of porous sintered nickel particles conductively united to each other along their facing layer surfaces. The pores of the nickel cover layers are then impregnated with the positive nickel hydroxide active mass of the type described above by any of the conventional processes used in loading the pores of sintered nickel powder electrode plates with nickel hydroxide active material, as is done in producing similar loaded electrode plates for nickel-cadmium batteries.

As another alternative, the silver electrode may have deposited over its entire exposed surface including its edges a thin porous enclosure layer of nickel evaporated in vacuum. To this end the silver electrode is used as constituting the substrate suspended in a vacuum chamber in which the nickel is evaporated. As examples, for such nickel vapor deposition there may be used apparatus of the type described in U.S. Patents 2,664,853, 2,665,229, 2,-703,334, 2,719,094, 2,693,521, and 2,730,986. However, care must be taken to maintain the silver electrode at a low temperature at which it remains in solid state and does not evaporate while depositing thereon the nickel coating, for instance, by surrounding it with spaced convolutions of a coating coil through which a cooling medium is passed or circulated. Simultaneously or interspersed between successive intervals of such nickel deposition, there is similarly deposited an organic compound the particles of which are interspersed with the nickel particles, and which has a low evaporizing temperature, so that upon completion of this dual deposition process, this organic compound is evaporated, to provide the pores which are thereafter loaded with the nickel hydroxide active electrode material.

The principles underlying and the practice of the invention will now be further described by reference to the drawings showing one example of a chargeable silver-cadmium battery cell.

The cell 10 comprises a casing 11 enclosing an electrode assembly comprising a plurality of adjacently held electrodes or electrode plates 12, 13 of opposite polarity. Adjacent opposite polarity electrode plates are separated from each other by a microporous electrically insulating separator 14 holding alkaline electrotype by which electrolytic conduction is maintained between terminal wall 12 of casing 11. The superposed electrode plates 12, 13 and their separators 14 may be held compressed, as seen in FIG. 12, between the surrounding casing side walls 11–1 in flatwise assembled position, as described, for instance, in Koren et al., Patent No. 2,708,211 or in a spirally coiled position as described in Belove Patent No. 3,083,249. The casing enclosure 11 may be of the sealed type, such as described in Belove Patents Nos. 3,081,366 or 3,083,249, or of the vented type, such as described in Belove Patent No. 2,892,006.

In the cell 10 shown in FIG. 1 each positive electrode 12 may consist of any of the known types of silver oxide electrodes described and/or used in the past, such as pocket-type, or porous-sintered type electrodes. Each negative electrode 13 may consist of or contain as active material cadmium hydroxide, such as used in nickel-cadmium batteries, with the cadmium hydroxide or metallic cadmium held within a perforated pocket or in the interstices of a metal screen either of wire or expanded metal. Alternatively the active cadmium hydroxide or cadmium metal may be held in the pores of a porous sintered nickel-powder metal plate. Alternatively, the negative electrode 13 may consist or contain as active material zinc hydroxide, and may be of any type known in the art. The structures of such prior art positive and negative electrodes are fully described in various publications and patents, including the references listed on pages 60 to 67 of the WADD Technical Report 61–36 by J. Rhyne, Jr. of General Motors Corporation, entitled, "Silver-Oxide Zinc Battery."

To simplify the explanation of a practical example of the present invention it will be described in connection with a sealed alkaline rechargeable cell wherein the positive electrode consists of a porous layer of sintered silver particles having embedded therein a reinforcing metallic backing carrier consisting of a high-density perforated metallic foil or a metallic screen. The metallic backing carrier may be formed either as a thin wire screen or perforated foil or an expanded metal sheet.

FIGS. 2 and 3 show in detail one form of a positive cell electrode 12 of the invention for battery cells of the type described above in connection with FIG. 1. It comprises a high prosity layer or plate shaped body 21 of sintered silver particles having embedded therein a reinforcing metallic carrier 22 of thin perforated metal foil or expanded metal foil on wire screen. In the past sintered silver electrode plates of this type have been made with backing carrier 22 of silver. Superior sintered silver electrode plates of the foregoing type are obtained by making its high density carrier 22, not of silver, but, instead, of nickel, such as used in sintered nickel powder electrodes of nickel-cadmium batteries.

The interior porous sintered silver electrode plate 21 is compacted to high density along a terminal edge region 23 to which is joined as by welding a terminal tab 16 of high conductivity sheet metal. Good results are obtained with metal tabs 16 of nickel, although metal tabs of other metals which do not dissolve in alkaline electrolyte may be used. In addition, the porous silver plate body 21 may be compacted to high density along the entire edge to provide a thin high-density plate-edge-region 25. The opposite exterior faces of the plate-like silver electrode body 21 are covered or enclosed and also contacted with by two porous sintered nickel powder cover layers 31 having 80% to 88% porosity, of the type used in nickel-cadmium batteries, with carbonyl nickel powder.

The pores of each such sintered cover layers 31 are impregnated with nickel hydroxide such as used as active positive electrode material in nickel-cadmium batteries. Since the processes for impregnating the pores of sintered nickel powder electrodes with nickel hydroxide are well known no further description thereof is required. In such electrodes the discharge positive electrode mass consists of nickel (II) hydroxide, $Ni(II)(OH)_2$, which upon being charged is converted into nickel (III) hydroxide, $NiO(OH)$. The so impregnated sintered cover layer 31 are each shown with a thinner, compacted terminal tab region 33 overlapping the thin tab region 23 of silver plate 21. Each such cover layer 31 has also a thin compacted edge region 35 overlapping and extending slightly beyond the thin edge region 25 of the silver plate 21. The overlapping thin tab regions 33 and edge regions 35 of the two cover plates 31 are secured, as by electric welding, for instance, to the underlying tab region 23 and edge region 25 of the silver plate 23 and to each other also along their marginal edge regions extending beyond the silver plate 21.

In accordance with a phase of the invention each of the sintered nickel-powder cover layers 31 is made without any reinforcing metal foil or wire mesh grid bedded in the layer. Instead, each such sintered cover layer self-supporting is provided with a cross-crossing network of coined or compacted reinforcing zones 36 of high density and strength subdividing the sintered layer 31 into layer sections 37 of high porosity which are loaded with the nickel-hydroxide active electrode material. As seen in FIG. 3–A, the array of such criss-crossing compacted coined reinforcing zones 36 is formed along one side of each cover layer plate 31.

Alternatively as seen in FIG. 3–B, a similar high porosity electrode plate 31–5 may be compacted or coined from the opposite planar sides thereof to form similar two transversely extending arrays of criss-crossing narrow thin compacted reinforcing zones 35–6 extending along the central plane of the electrode sintered cover plate 31–5 to assure that it may be handled without excessive breakage or cracking. Substantially the entire body of such coined sintered metal cover plates 31 or 31–5 has great porosity and is loaded with the active nickel hydroxide material.

It is important to assure good conductive connection between the two cover plates 31 and the embraced interior silver electrode plate 21. Such good conductive connections may be made by applying electric welding current to the superposed silver plate and the two nickel cover layers at a plurality of electrode portions distributed over the surface of each silver electrode. Alternatively the conductive connections are secured by the application of a compacting force to such electrode portions where the nickel layers are sintered to the silver layer, the sinter bonds form the conductive connections. Similar good connections are made with the nickel layer enclosures deposited by evaporation. As explained above, each such process may be used for depositing on the entire exposed surface of such silver electrode 21 outer porous layer and edge enclosures of nickel, the pores of which are thereafter impregnated with nickel hydroxide positive electrode material.

The principles underlying the invention described in connection with specific exemplifications will suggest other modifications thereof. It is accordingly desired that the appended claims shall not be limited to specific examples shown or described herein.

We claim:

1. In an alkaline rechargeable storage battery cell having at least two opposite-polarity porous cell electrodes comprising a positive electrode and a negative electrode, a porous insulating separator between said two electrodes and alkaline electrolyte in the pores of and between said electrode plates and in said separator for maintaining electrolytic charge and discharge operations between said positive and negative electrodes across said separator, the charged active material of said positive electrode consisting of silver oxide selected from the group consisting of silver (II) oxide—Ag(II)O—and silver (I) oxide—$Ag_2(I)O$—which silver oxide is converted by the discharge into silver—Ag—and which silver oxide is being transferred incident to the operation of said cell from said positive electrode to said negative electrode and causes reduction of the effective capacity of said cell, and in combination therewith the improvement comprising an electrically conductive porous sheath consisting of sintered nickel particles enclosing all exposed surfaces of said positive electrode and having electroconductive connections to said enclosed positive electrode, the pores of said sintered nickel-particle sheath containing nickel hydroxide which in the charged state consists of nickel (III) oxyhydroxide—NiO(OH)—and is converted by the discharge into nickel (II) hydroxide—$Ni(OH)_2$—which nickel hydroxide has the property of suppressing transfer of said silver oxide of said positive electrode to said negative electrode in the charging and discharging operations of said cell.

2. In a rechargeable cell as claimed in claim 1, said positive electrode having the shape of a generally rectangular thin plate, said sheath of sintered nickel powder particles being metallically joined to underlying portions of said silver-oxide positive electrode along a plurality of rows of compacted nickel particles of said sheath extending parallel to two opposite edges of said rectangular plate.

3. In a rechargeable cell as claimed in claim 1, said positive electrode having the shape of a generally rectangular thin plate, said sheath of sintered nickel powder particles being metallically joined to underlying portions of said silver-oxide positive electrode along one set of a plurality of rows of compacted nickel particles of said sheath extending parallel to two opposite edges of said rectangular plate, and another set of a similar plurality of rows of compacted nickel particles extending transversely to said one set of compacted nickel particles.

References Cited

UNITED STATES PATENTS

| | | | |
|---|---|---|---|
| 2,162,385 | 6/1939 | Langguth | 204—56 |
| 2,677,006 | 4/1954 | Amelin | 136—40 X |
| 3,194,684 | 7/1965 | Wells | 136—14 X |
| 3,203,879 | 8/1965 | Mueller | 204—56 |

WINSTON A. DOUGLAS, *Primary Examiner.*

B. J. OHLENDORF, A. SKAPARS, *Assistant Examiners.*